(12) United States Patent
Vanden Heuvel et al.

(10) Patent No.: US 6,519,336 B1
(45) Date of Patent: Feb. 11, 2003

(54) METHOD AND APPARATUS FOR PROVIDING INTEROPERATION BETWEEN A DIGITAL COMMUNICATION SYSTEM AND A PUBLIC SWITCHED TELEPHONE NETWORK

(75) Inventors: Dean Paul Vanden Heuvel, Chandler, AZ (US); Scott David Blanchard, Mesa, AZ (US)

(73) Assignee: General Dynamics Decision Systems, Inc., Scottsdale, AZ (US)

( * ) Notice: Subject to any disclaimer, the term of this patent is extended or adjusted under 35 U.S.C. 154(b) by 339 days.

(21) Appl. No.: 09/650,516

(22) Filed: Aug. 29, 2000

(51) Int. Cl.[7] .......................... H04J 3/16; H04L 12/66; H04L 29/06; H04M 7/00; H04M 11/06
(52) U.S. Cl. ...................... 379/219; 370/352; 370/376; 370/389; 370/401; 370/467; 379/93.08; 379/93.09; 379/93.31; 379/93.34; 379/237
(58) Field of Search ................. 370/352, 376, 370/389, 401, 465, 466, 467; 379/90.01, 93.01, 93.05, 93.06, 93.08, 93.09, 93.31, 219, 220.01, 229, 236, 237

(56) References Cited

U.S. PATENT DOCUMENTS 5,606,599 A * 2/1997 O'Mahony et al. ......... 379/88.1
6,236,653 B1 * 5/2001 Dalton et al. ............... 370/352
6,324,176 B1 * 11/2001 Bodnar et al. .............. 370/376

* cited by examiner

Primary Examiner—Harry S. Hong
(74) Attorney, Agent, or Firm—Jenner & Block, LLC

(57) ABSTRACT

An interworking unit (14) for providing an interface between a digital communication network (12) and a public switched telephone network (PSTN) (16) includes a de-vocoder (30), a protocol termination unit (32), and a signal combiner (34) for processing signals being transferred from the digital network (12) to the PSTN (16). A digital communication signal received by the interworking unit (14) from the digital network (12) is processed by both the de-vocoder (30) and the protocol termination unit (32). The outputs of the de-vocoder (30) and the protocol termination unit (32) are then combined into a uniquely formatted signal that is then delivered into the PSTN (12). Similar functionality is also provided for processing signals in the reverse direction. The interworking unit 14 is capable of processing signals traversing the interface between the networks (12, 16) without a priori knowledge of the signal type being processed.

27 Claims, 4 Drawing Sheets

METHOD AND APPARATUS FOR PROVIDING INTEROPERATION BETWEEN A DIGITAL COMMUNICATION SYSTEM AND A PUBLIC SWITCHED TELEPHONE NETWORK

FIELD OF THE INVENTION

The invention relates generally to communication systems and, more particularly, to techniques for providing interoperation between systems utilizing different transmission protocols.

BACKGROUND OF THE INVENTION

Many communication systems in development today deliver information between users in a purely digital format. It is often desirable that users within such systems be able to communicate with users within an external public switched telephone network (PSTN). Such communication can be difficult because digital communication systems typically utilize unique system-native digital signal formats to transfer information within the system. These signal formats are usually incompatible with the formats used by the PSTN and therefore conversions must be performed at the interface between the digital system and the PSTN.

Digital communication systems and PSTNs are each typically capable of carrying both voice and data signals. Digital systems generally use a vocoding algorithm to compress digital speech signals within the system and some form of protection protocol to protect the integrity of data within the system. PSTNs, on the other hand, generally use basic pulse code modulation (PCM) techniques to format speech signals being delivered within the network and some form of modem standard to deliver data within the PSTN.

As can be appreciated, to provide interoperation between a digital system and a PSTN, voice and data signals traversing the system interface must be appropriately converted. Traditionally, this has required a priori knowledge of signal type at the system interface to accurately convert the signals. Relatively complex signaling schemes (e.g., multi-numbering schemes) have been developed for providing this information at the interface to support the signal conversion process. These signaling schemes are usually very inefficient and utilize system resources that could otherwise be used for other purposes.

Therefore, there is a need for a method and apparatus that is capable of providing efficient interoperation between a digital communication system and a PSTN. It is desirable that the method and apparatus provide interoperation for both voice and data signals traversing the interface between the systems in a relatively seamless fashion. In addition, it is desirable that the method and apparatus provide such interoperation without the need for a priori knowledge of signal type at the interface.

DETAILED DESCRIPTION OF A PREFERRED EMBODIMENT

The present invention relates to a system for providing interoperation between a digital communication system and a public switched telephone network (PSTN). The system is capable of relatively seamless operation and does not require the use of complex signaling schemes to provide a priori knowledge of signal type at the system interface. A unique signal format is provided that allows communication signals to flow freely across the system interface regardless of signal type. In this manner, the usage of the channel is controlled by the end user devices and need not be established at call set up time. In addition, the channel usage can be changed during a call by one of the end user devices without the need to reconfigure the interface. The inventive principles can be used in connection with virtually any form of digital communication system including both wired and wireless systems. For example, the digital communication system can include a satellite communication system, a digital cellular system, a personal communication system (PCS), a local area network (LAN), a wide area network (WAN), or any combination of such systems.

Figure 1:
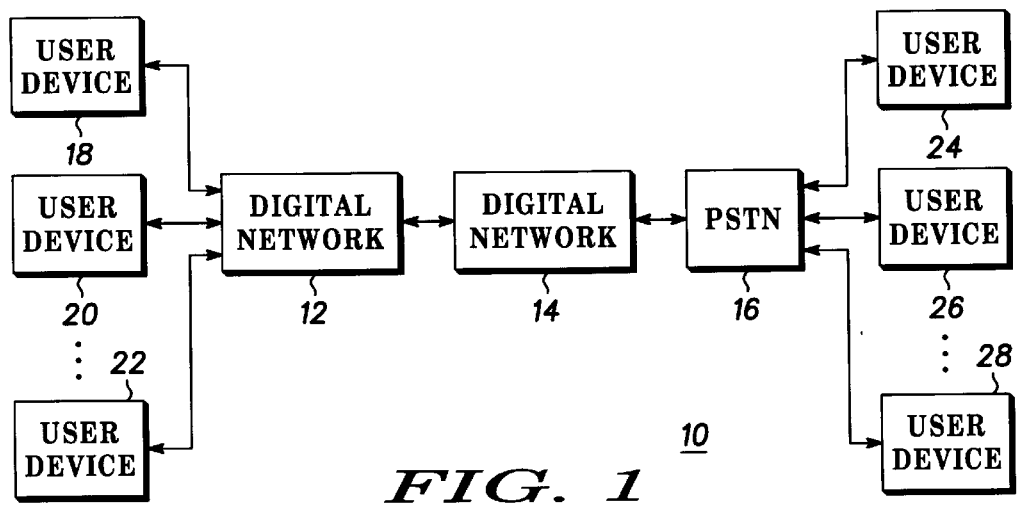
FIG. 1 is a block diagram illustrating a communication system in accordance with one embodiment of the present invention.

FIG. 1 is a block diagram illustrating a communication system 10 in accordance with one embodiment of the present invention. As illustrated, the communication system 10 includes a digital network 12, an interworking unit 14, and a public switched telephone network (PSTN) 16. As described above, the digital network 12 can include virtually any form of digital communication system. As illustrated, the digital network 12 is coupled to a plurality of user devices 18, 20, 22 that can be used by subscribers to transmit and receive voice and/or data signals with remote communication entities. Likewise, the PSTN 16 is coupled to a plurality of user devices 24, 26, 28 that can be used by subscribers to communicate with remote entities. The user devices 18, 20, 22 associated with the digital network 12 and the user devices 24, 26, 28 associated with the PSTN 16 can each include virtually any form of communication device including, for example, conventional telephone units, cellular telephone units, terrestrial subscriber units, personal computers, server units, pagers, palm top computers, and others.

The digital network 12 utilizes predetermined digital signal formats for transferring signals within the network 12.

For example, a predetermined vocoding algorithm is used within the digital network 12 to compress voice signals being delivered within the network 12. Similarly, data protection and transport protocols (e.g., error correction coding, encapsulation, etc.) are used within the digital network 12 for providing data protection and transport functions for "data" signals being transmitted within the digital network 12. These "system-native" digital signal formats are used for all signals being transmitted within the digital network 12 (e.g., a signal being transmitted between user device 18 and user device 22) but not for signals being transferred outside the network 12. It should be appreciated that the term "data" is used herein to describe typical computer-compatible digital data and the like, such as the information that is commonly transmitted via modem from/ to a personal computer. As such, the term "data" is not meant to include conventional voice signals (or other audio signals), such as the signals generated during voice-based telephony operations (e.g., a telephone conversation between two parties).

The PSTN 16 is preferably a conventional PSTN system using either the 64 kilobit per second (kbps) International Telecommunications Union (ITU) backbone standard (E1) or the 64 kbps American National Standards Institute (ANSI) backbone standard (T1) to convey PCM-encoded audio. These systems each utilize a frame rate of 8 kilohertz (kHz) and a sample size of 8 bits (for a total channel rate of 64 kbps) to transfer audio signals through the network. A single ITU E1 link consists of 32 channels of 64 kbps, however at least one channel must be dedicated to timing signals and optionally one channel dedicated to network signaling. A single ANSI T1 link consists of 24 channels of 64 kbps. In an ANSI T1 link, signaling is embedded in each channel using a method called "robbed bit signaling", in which the LSB of the channel is periodically and infrequently replaced with a bit from the signaling stream.

Each 125 microsecond ($\mu s$) frame includes one voice sample corresponding to each of 30 or 31 (ITU E1) individual communication channels or 24 (ANSI T1) individual communication channels with each sample having 8 bits. Note that in the ANSI T1 case, periodically and infrequently the LSB of any sample may be "robbed" by the system to facilitate system signaling. It should be appreciated that the inventive principles can also be used in systems using other backbone standards.

When a user associated with the digital network 12 wishes to communicate with a user associated with PSTN 16, or vice versa, the interworking unit 14 provides the signal conversions necessary to support the connection. In accordance with the present invention, techniques are provided for performing this interface function in an efficient and relatively transparent manner. In addition, as will be described in greater detail, the interworking unit 14 does not require a priori knowledge of signal type to provide interoperation between the networks 12, 16. The interworking unit 14 can be a standalone unit or it can be incorporated into either the digital network 12 or the PSTN 16. For example, in one embodiment, the interworking unit 14 is implemented within a terrestrial-based satellite gateway for use in coupling a satellite communication system (i.e., a digital network) to the PSTN.

Figure 2:
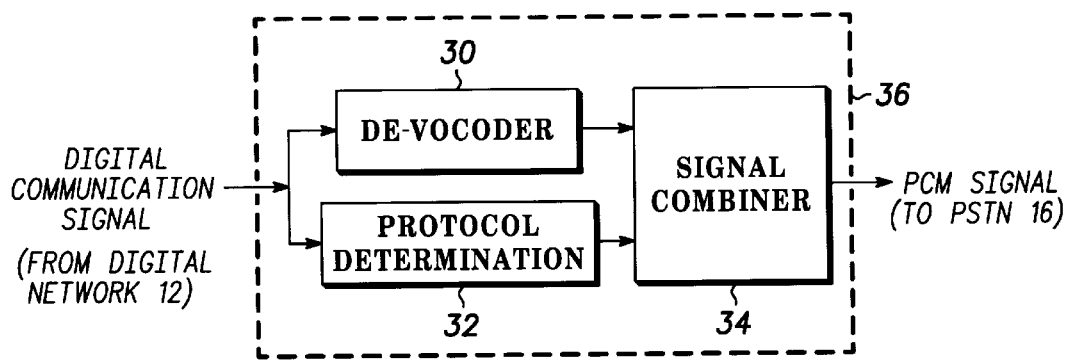
FIG. 2 is a block diagram illustrating an interworking function in accordance with one embodiment of the present invention.

FIG. 2 is a block diagram illustrating an interworking function (IWF) 36 for processing a digital communication signal being transferred from the digital network 12 to the PSTN 16 in one embodiment of the present invention. In a preferred approach, this IWF 36 is implemented in software within a digital processing device. Hardware implementations can also be used. As illustrated, the IWF 36 includes a de-vocoder 30, a protocol termination unit 32, and a signal combiner unit 34. Both the de-vocoder 30 and the protocol termination unit 32 receive the digital communication signal from the digital network 12 and process it, preferably in parallel. The de-vocoder 30 removes any system-native vocoding from the digital signal and generates PCM audio samples at the output thereof. In a similar fashion, the protocol termination unit 32 removes any system-native data protocols from the digital signal to generate a data stream of bit-exact digital data. The protocol termination unit 32 will typically encapsulate the arriving bit-exact data within a low-rate carrier stream sufficient to handle the entire user data stream. One example of such a carrier stream is the multi-rate V.110 standard in which low rate data can be transported by an 8 kbps (or higher) bit stream. In addition to user data, the remainder of the 8 kbps stream is utilized for functions such as synchronization. By performing both de-vocoding and protocol termination on the incoming digital signal, it is not necessary to know the type of the incoming signal beforehand. That is, both forms of processing are performed regardless of signal type.

The signal combiner 34 is operative for combining the PCM audio samples generated by the de-vocoder 30 with the bit-exact data stream generated by the protocol termination unit 32 to generate a uniquely formatted communication signal for delivery into the PSTN 16. The user devices 24, 26, 28 and/or the local offices associated with the PSTN 16 will be configured to recognize and decode this uniquely formatted communication signal upon receipt. In one embodiment of the present invention, the bit-exact digital data stream from the protocol termination unit 32 is superimposed upon the PCM voice samples from the de-vocoder 30 to generate the signal that is delivered into the PSTN 16. Preferably, each bit of the bit-exact data stream is inserted into the least significant bit (LSB) position of one of the PCM voice samples before the samples are strobed onto the PSTN backbone. One familiar with the art will understand that within ITU E1 links, this insertion can be a straightforward, 1 bit-per-sample insertion, while in ANSI T1 systems, a more complex insertion is required to avoid corruption caused by robbed bit signaling techniques. For ANSI T1 systems, the data stream may include Forward Error Correction (FEC) techniques to restore any robbed bits upon receipt of the data at the destination device. Alternatively, another bit position may be utilized (e.g., the second LSB) that would avoid corruption, but would induce more audio corruption. As will be apparent to person of ordinary skill in the art, other signal combination schemes are also possible. In an alternate embodiment, protocol terminator 32 modulates the low-rate carrier stream onto a modem waveform such as detailed in the V.34 standard that is treated as PCM audio by the PSTN.

Figure 3:
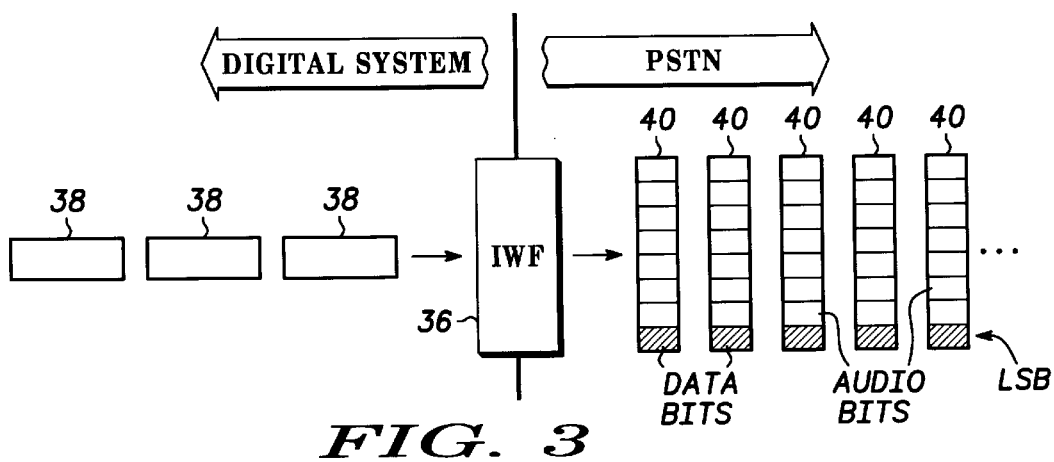
FIG. 3 is a signal diagram illustrating a signal conversion performed by the interworking function of FIG. 2 in accordance with one embodiment of the present invention.

FIG. 3 is a diagram illustrating the signal conversion process for a digital signal travelling from the digital network 12 to the PSTN 16 in one embodiment of the present invention. As shown, the interworking function (IWF) 36 receives either low rate digital voice or data frames 38 (e.g., 8 kbps or lower) from the digital network 12 for delivery to a specific user device within the PSTN 16. The IWF 36, not previously knowing the signal-type of the received signal, processes the signal as described above to generate PCM audio samples and a bit-exact digital data stream. The IWF 36 next inserts the individual bits of the data stream into the LSB positions of the PCM voice samples 40 before delivering the samples to the PSTN backbone. The modified samples are then delivered to the appropriate user device (or the central office associated therewith) for decoding.

Figure 4:
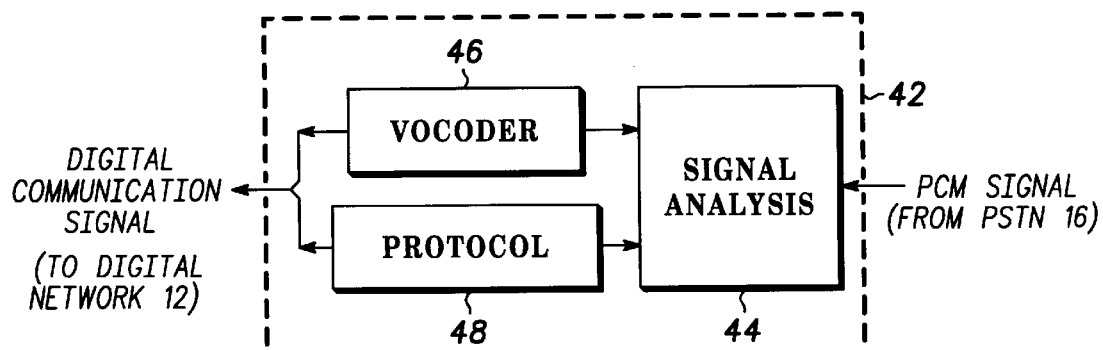
FIG. 4 is a block diagram illustrating an interworking function in accordance with another embodiment of the present invention.

FIG. 4 is a block diagram illustrating an IWF 42 for processing a communication signal being transferred from a user within the PSTN 16 to a user within the digital network 12 in one embodiment of the present invention. If the user within the PSTN 16 is delivering "data" to the user within the digital network 12, the corresponding user device (or another communication device) would insert the individual data bits into the LSB bit positions of the PCM samples to be delivered to the interworking unit 14. In such a case, dummy PCM audio samples can be used (i.e., samples in which the voice bits do not matter). If the user within the PSTN 16 is delivering "voice" information to the user in the digital network 12, the user will send full bit length PCM samples carrying the voice information, without any inserted data.

As illustrated in FIG. 4, the IWF 42 includes a signal analysis unit 44, a vocoder 46, and a protocol unit 48. The signal analysis unit 44 receives the PCM voice samples from the PSTN 16 and proceeds to analyze the LSB positions of the samples 60 to determine if a detectable digital carrier (e.g., a v.110 pattern) exists. If the signal analysis unit 44 detects a carrier, it then extracts the digital data from the received samples. The extracted digital data is then encoded within the protocol unit 48 which implements the system-native data formatting algorithm(s). The formatted data is then passed to the transport mechanism of the digital network 12 for delivery to its final destination. If the signal analysis unit 44 does not detect a carrier, the signal analysis unit 44 collects a known time sample of PCM samples and delivers the samples to the vocoder 46 which implements the system-native vocoding algorithm of the digital network 12 to compress the voice signal. The vocoded voice signal is then passed to the transport mechanism of the digital network 12 for delivery to its final destination.

Figure 5:
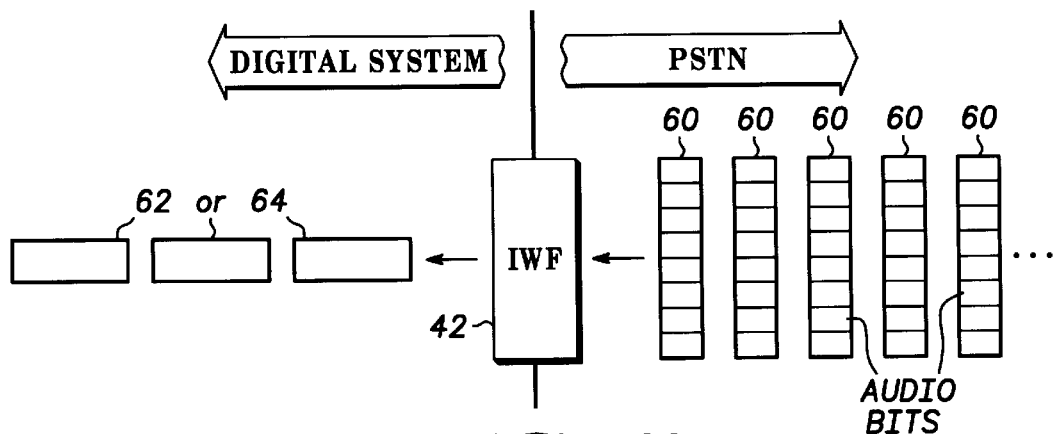
FIG. 5 is a signal diagram illustrating a signal conversion performed by the interworking function of FIG. 4 in accordance with one embodiment of the present invention.

FIG. 5 is a diagram illustrating the signal conversion process for a digital signal travelling from the PSTN 16 to the digital network 12 in one embodiment of the present invention. As shown, the IWF 42 receives the PCM samples 60 from the PSTN 16. As described above, these samples may or may not include individual bits of user data within the LSB positions thereof. The IWF 42 sniffs the LSB positions of the received samples to determine whether a predetermined data carrier is present. As described above, if a carrier is detected, the IWF 42 extracts the data, applies the system-native protocol(s), and passes the encoded data to the digital network's transport mechanism. If the carrier is not detected, the IWF 42 vocodes the voice samples and passes the compressed voice information to the digital network's transport mechanism.

It should be appreciated that the use of the LSB position (or another position) within the PCM samples for the delivery of data bits will degrade the quality of any voice signal being delivered. Thus, in one embodiment of the present invention, the interworking unit 14 only overlays digital data onto the PCM samples traveling toward the PSTN 16 when "data" is detected in the samples flowing in the opposite direction for the same channel. It is assumed that the same type of information will be flowing in both directions for any particular channel at a particular time. Thus, if the interworking unit 14 does not detect the presence of data in the samples flowing toward the digital network 12, it will not place data bits in the PCM samples being delivered to the PSTN 16. Consequently, the quality of the voice samples will not be degraded when voice communication is occurring between the users. In one approach, this feature can be manually activated or deactivated by a system operator or the like.

Figure 6:
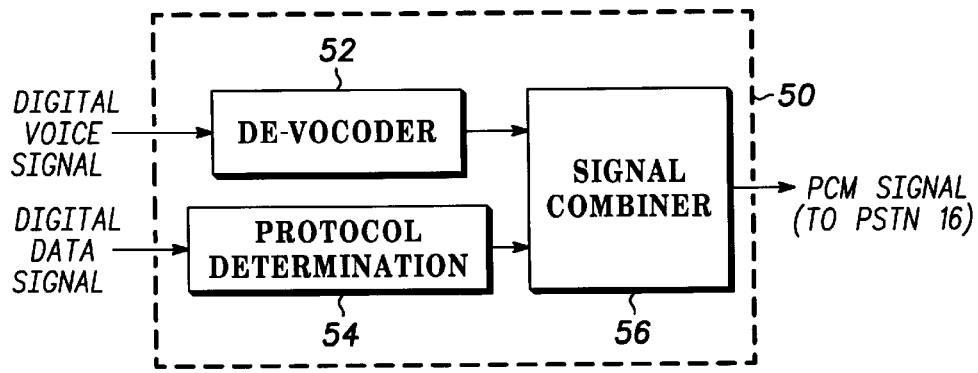
FIG. 6 is a block diagram illustrating an interworking function in accordance with still another embodiment of the present invention.

FIG. 6 is a block diagram illustrating an interworking function (IWF) 50 for processing a digital communication signal being transferred from a user within the digital network 12 to a user within the PSTN 16 in another embodiment of the present invention. As in the embodiment illustrated in FIG. 2, the IWF 50 of FIG. 6 includes a de-vocoder 52, a protocol termination unit 54, and a signal combiner 56. However, instead of processing the same digital communication signal in both the de-vocoder 52 and the protocol termination unit 54, the IWF 50 of FIG. 6 is able to process a digital voice signal in the de-vocoder 52 and a digital data signal in the protocol termination unit 54 at the same time. Thus, the output of the signal combiner 56 can include both voice sample information and bit-exact digital data within each sample. As a result, a single communication channel between a user in the digital network 12 and a user in the PSTN 16 can carry both data and voice information (albeit low rate information) simultaneously.

Figure 7:
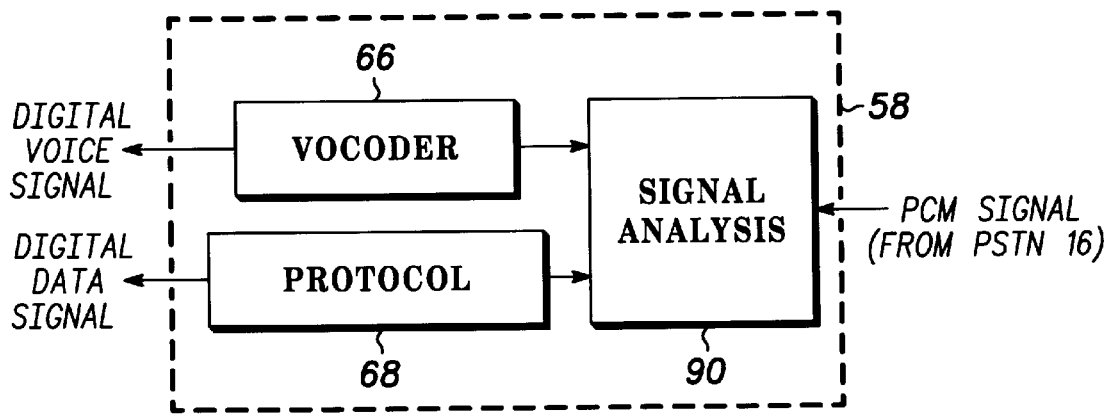
FIG. 7 is a flowchart illustrating a method for processing a communication signal being transferred from a digital communication network into a PSTN in accordance with one embodiment of the present invention.

FIG. 7 is a block diagram illustrating an interworking function (IWF) 58 for processing a communication signal being transferred from a user within the PSTN 16 to a user within the digital network 12 in another embodiment of the present invention. As illustrated, the IWF 58 includes: a vocoder 66, a protocol unit 68, and a signal analysis unit 90. The signal analysis unit 90 receives PCM samples from the PSTN 16 that can include either voice, data, or both voice and data. The signal analysis unit 90 analyzes the received samples to determine whether data is present in the samples. If data is present, it is extracted and encoded using the system-native protocol(s). It is next determined whether the remaining bit positions within the samples include voice information. If so, the voice information is delivered to the vocoder 66 for compression of the voice signal. The resulting signals are then transferred to the digital system transport mechanism. If data is not present, the full samples are automatically delivered to the vocoder 66 for compression of the voice signal and the result is delivered to the transport mechanism. In this manner, both voice and data can be transferred from a user in the PSTN 16 to a user in the digital network 12 simultaneously.

The principles of the present invention are particularly advantageous in communication systems that support (or wish to support) "data-like" communication applications, such as encrypted voice. These applications generally include some of the qualities of both data and voice communications. For example, encrypted voice signals (e.g., secure communications) should, like most data communications, maintain a very low error rate and should, like voice communications, maintain low latency and smooth delivery to the destination user. In accordance with one aspect of the present invention, the encrypted voice signals are treated as data transmissions through the system. In addition, because data is delivered in the system in a relatively smooth and uninterrupted manner, low latency is maintained during the communication. The destination user then receives the encrypted voice samples, extracts the bit-exact data content therefrom, assembles the encrypted message, and then removes the encryption using the appropriate key. The inventive principles can also be used in connection with other "data-like" and "voice-like" communication applications.

Figure 8:
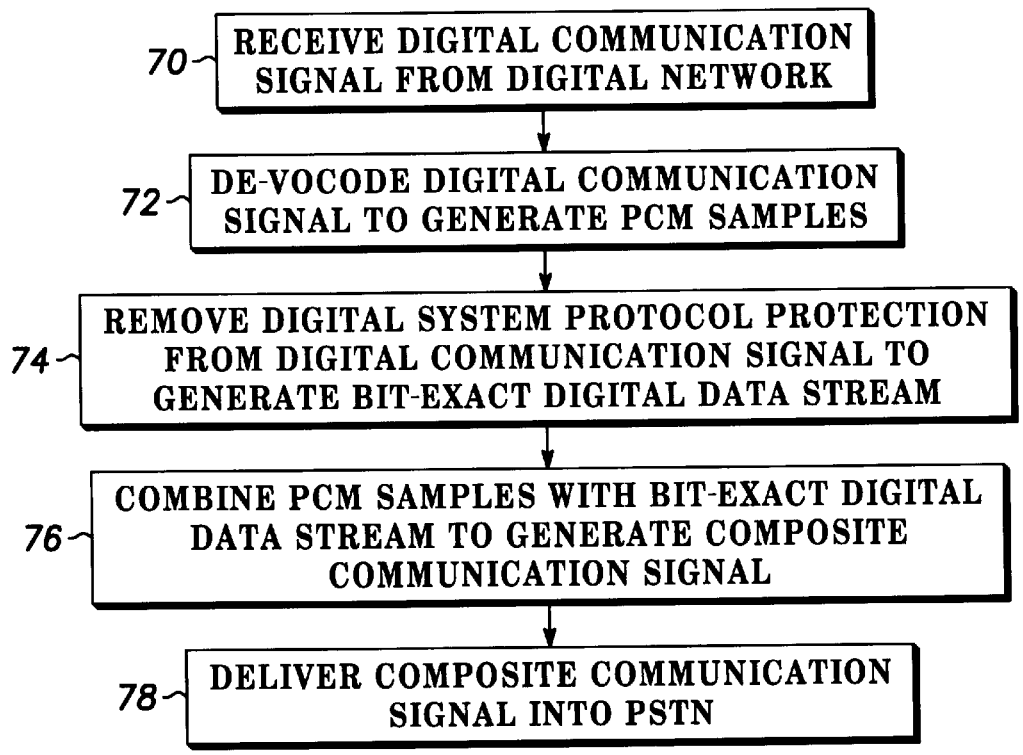
FIG. 8 is a flowchart illustrating a method for processing a communication signal being transferred from a PSTN into a digital communication network in accordance with one embodiment of the present invention.

FIG. 8 is a flowchart illustrating a method for processing a communication signal being transferred from a digital communication network into a PSTN. As illustrated, a digital communication signal is first received from the digital communication network (step 70). The digital communication signal can include either voice or data, but it is not necessary to know which one to perform the method. The digital communication signal is processed using a de-vocoding algorithm to generate PCM audio samples (step 72). If the digital communication signal does not include vocoded information (e.g., compressed voice) then the PCM samples that are generated in step 72 include useless information. The digital communication signal is also processed using a protocol termination algorithm that is adapted to remove any system-native protection protocols from the signal to generate a data stream of bit-exact digital data (step 74). If the digital communication signal does not include protocol protected data then the resulting data stream will include useless information. The PCM samples and the data stream are then combined into a composite signal (step 76) which is delivered into the PSTN (step 78). In a preferred approach, the individual bits of the data stream are inserted into the LSB positions of the PCM samples which are then strobed onto the PSTN backbone.

Figure 9:
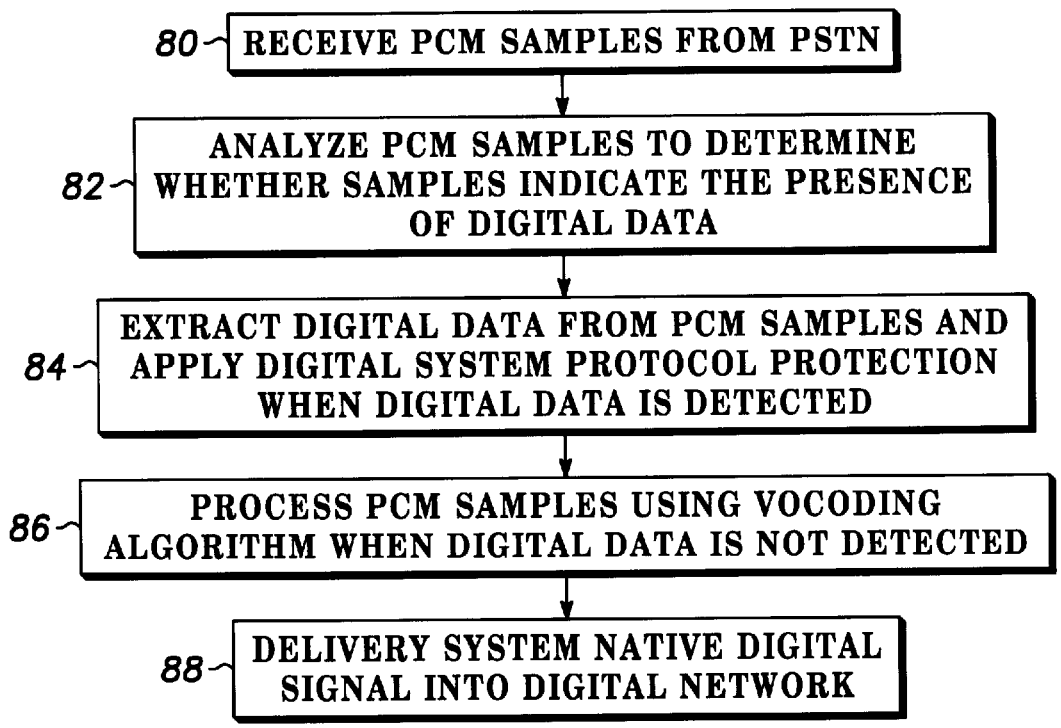
FIG. 9 is a flowchart illustrating a method for processing a communication signal being transferred from a PSTN into a digital communication network in accordance with one embodiment of the present invention.

FIG. 9 is a flowchart illustrating a method for processing a communication signal being transferred from a PSTN into a digital communication network. As illustrated, a series of PCM samples are first received from the PSTN (step 80). The samples can include audio information (e.g., voice) or data. The samples are then analyzed to determine whether digital data is present therein (step 82). In one approach, the LSB positions of the samples are monitored to determine whether they include a predetermined digital pattern (e.g., the v.110 pattern)(step 82). If data is detected within the samples, the data is extracted from the samples and processed using the system-native protection protocol (step 84). If digital data is not detected, the PCM samples are processed using the system-native vocoding algorithm (step 86). The system-native digital signal is then delivered into the digital network (step 88).

What is claimed is:

1. An interworking subsystem for providing interoperation between a digital communication network and a public switched telephone network (PSTN), said interworking subsystem comprising:

an input for receiving a first communication signal from the digital communication network;

a de-vocoder for performing a de-vocoding operation on said first communication signal to generate a first output signal, wherein said first output signal includes a plurality of pulse code modulation (PCM) samples;

a protocol termination unit for performing a protection protocol termination operation on said first communication signal to generate a second output signal, wherein said second output signal includes a stream of digital data bits; and a signal combiner for combining said first output signal and said second output signal into a composite signal for delivery to a destination user within the PSTN, wherein said signal combiner overlays said stream of digital data bits onto said plurality of PCM samples.

2. The interworking subsystem claimed in claim 1, wherein said de-vocoder and said protocol termination unit each operate upon said first communication signal regardless of a signal type of said first communication signal.

3. The interworking subsystem claimed in claim 1, further comprising:

a second input for receiving a second communication signal from the PSTN;

a signal analyzer for analyzing said second communication signal to determine whether said second communication signal includes digital data;

a data extractor for extracting digital data from said second communication signal when said signal analyzer detects digital data therein; and a protocol unit for applying a system-native digital protocol associated with the digital communication network to said digital data to generate a protocol protected digital data signal for delivery to a user within the digital communication network.

4. The interworking subsystem claimed in claim 3, further comprising a vocoder for performing a vocoding operation on said second communication signal when said signal analyzer does not detect digital data within said second communication signal.

5. An interworking subsystem for providing interoperation between a digital communication network and a public switched telephone network (PSTN), said interworking subsystem comprising:

an input for receiving a first communication signal from the digital communication network;

a de-vocoder for performing a de-vocoding operation on said first communication signal to generate a first output signal, wherein said first output signal includes a plurality of pulse code modulation (PCM) samples;

a protocol termination unit for performing a protection protocol termination operation on said first communication signal to generate a second output signal, wherein said second output signal includes a stream of digital data bits; and a signal combiner for combining said first output signal and said second output signal into a composite signal for delivery to a destination user within the PSTN, wherein said signal combiner inserts individual data bits from said stream of digital data bits into predetermined bit positions within the plurality of PCM samples.

6. The interworking subsystem claimed in claim 5, wherein:

said signal combiner inserts data bits into the predetermined bit positions of the plurality of PCM samples only when a signal received by the interworking subsystem from the destination user within the PSTN includes digital data.

7. The interworking subsystem claimed in claim 5, wherein said de-vocoder and said protocol termination unit each operate upon said first communication signal regardless of a signal type of said first communication signal.

8. The interworking subsystem claimed in claim 5, further comprising:

a second input for receiving a second communication signal from the PSTN;

a signal analyzer for analyzing said second communication signal to determine whether said second communication signal includes digital data;

a data extractor for extracting digital data from said second communication signal when said signal analyzer detects digital data therein; and a protocol unit for applying a system-native digital protocol associated with the digital communication network to said digital data to generate a protocol protected digital data signal for delivery to a user within the digital communication network.

9. The interworking subsystem claimed in claim 8, further comprising a vocoder for performing a vocoding operation on said second communication signal when said signal analyzer does not detect digital data within said second communication signal.

10. A method for providing interoperation between a digital communication network and a public switched telephone network (PSTN), said method comprising:

receiving a system-native digital communication signal from the digital communication network;

processing the system-native digital communication signal using a de-vocoding routine to generate a first intermediate signal, wherein said first intermediate signal includes a plurality of pulse code modulation (PCM) samples;

processing the system-native digital communication signal using a protocol termination routine to generate a second intermediate signal, wherein said second intermediate signal includes a stream of digital data bits; and combining said first and second intermediate signals into a composite signal for delivery into the PSTN, wherein said step of combining includes distributing individual bits from said stream of digital data bits into predetermined bit positions within said PCM samples.

11. A method for providing interoperation between a digital communication network and a public switched telephone network (PSTN), said method comprising:

receiving a system-native digital communication signal from the digital communication network;

processing the system-native digital communication signal using a de-vocoding routine to generate a first intermediate signal, wherein said first intermediate signal includes a plurality of pulse code modulation (PCM) samples;

processing the system-native digital communication signal using a protocol termination routine to generate a second intermediate signal, wherein said second intermediate signal includes a stream of digital data bits; and combining said first and second intermediate signals into a composite signal for delivery into the PSTN, wherein said step of combining includes inserting successive bits from said stream of digital data bits into least significant bit (LSB) positions of successive PCM samples.

12. A method for formatting data for delivery through a public switched telephone network (PSTN), comprising:

providing PCM samples, each of said PCM samples having a plurality of bit positions including a least significant bit (LSB) position, wherein said step of providing PCM samples includes acquiring an analog audio signal and sampling said analog audio signal at a predetermined sampling rate;

providing a stream of user data bits; and substituting individual user data bits from said stream of user data bits into predetermined bit positions of said PCM samples before delivering said PCM samples through the PSTN.

13. The method claimed in claim 12, wherein said step of substituting includes substituting individual user data bits from said stream of user data bits into the LSB positions of said PCM samples.

14. The method claimed in claim 13, wherein said step of substituting includes substituting data bits in a sequential manner.

15. The method claimed in claim 12, wherein said step of providing PCM samples includes receiving a digital communication signal from a digital communication network and processing said digital communication signal using a de-vocoding algorithm.

16. The method claimed in claim 12, wherein said step of providing a stream of data bits includes receiving a digital communication signal from a digital communication network and removing a system-native protection protocol from said digital communication signal.

17. The method claimed in claim 12, wherein said step of providing a stream of data bits includes providing a computer data file having data to be transferred to a remote location and reading said computer data file.

18. A computer readable medium having a program stored thereon for implementing the method claimed in claim 12 when executed within a digital processor.

19. A communication device having a digital processor and a computer readable medium, said computer readable medium having a program stored thereon for implementing the method claimed in claim 12 when executed within said digital processor.

20. A method for formatting data for delivery through a public switched telephone network (PSTN), comprising:

providing PCM samples, each of said PCM samples having a plurality of bit positions including a least significant bit (LSB) position, wherein said step of providing PCM samples includes generating dummy samples including simulated audio information;

providing a stream of user data bits; and substituting individual user data bits from said stream of user data bits into predetermined bit positions of said PCM samples before delivering said PCM samples through the PSTN.

21. The method claimed in claim 20, wherein said step of substituting includes substituting individual user data bits from said stream of user data bits into the LSB positions of said PCM samples.

22. The method claimed in claim 21, wherein said step of substituting includes substituting data bits in a sequential manner.

23. The method claimed in claim 20, wherein said step of providing PCM samples includes receiving a digital communication signal from a digital communication network and processing said digital communication signal using a de-vocoding algorithm.

24. The method claimed in claim 20, wherein said step of providing a stream of data bits includes receiving a digital communication signal from a digital communication network and removing a system-native protection protocol from said digital communication signal.

25. The method claimed in claim 20, wherein said step of providing a stream of data bits includes providing a computer data file having data to be transferred to a remote location and reading said computer data file.

26. A computer readable medium having a program stored thereon for implementing the method claimed in claim 20 when executed within a digital processor.

27. A communication device having a digital processor and a computer readable medium, said computer readable medium having a program stored thereon for implementing the method claimed in claim 20 when executed within said digital processor.

* * * * *